Nov. 24, 1931. T. E. MURRAY 1,833,173
CIRCUIT BREAKING APPARATUS
Filed July 10, 1928 7 Sheets-Sheet 1

INVENTOR
THOMAS E. MURRAY.
BY
Anthony Idina, ATTORNEY

Nov. 24, 1931.  T. E. MURRAY  1,833,173
CIRCUIT BREAKING APPARATUS
Filed July 10, 1928  7 Sheets-Sheet 2

INVENTOR
Thomas E. Murray.
BY
Anthony Usina, ATTORNEY

Nov. 24, 1931.  T. E. MURRAY  1,833,173
CIRCUIT BREAKING APPARATUS
Filed July 10, 1928  7 Sheets-Sheet 7

INVENTOR
Thomas E. Murray.
BY
D. Anthony Ulina, ATTORNEY

Patented Nov. 24, 1931

1,833,173

UNITED STATES PATENT OFFICE

THOMAS E. MURRAY, OF BROOKLYN, NEW YORK; JOSEPH BRADLEY MURRAY, THOMAS E. MURRAY, JR., AND JOHN F. MURRAY, EXECUTORS OF SAID THOMAS E. MURRAY, DECEASED, ASSIGNORS TO METROPOLITAN DEVICE CORPORATION, A CORPORATION OF NEW YORK

CIRCUIT BREAKING APPARATUS

Application filed July 10, 1928. Serial No. 291,636.

The invention aims to provide a comparatively simple and inexpensive circuit breaker which can be used in place of the oil switch and accessories now generally used on high-tension circuits.

The accompanying drawings illustrate embodiments of the invention.

Fig. 1 is a perspective, partly in section, of a set of switches and fuses;

Fig. 1ª is a diagram of the same;

Fig. 1ᵇ is an alternative diagram;

Figs. 6, 7 and 8 illustrate a modification.

The installation is designed to replace the oil switch or circuit breaker which is commonly used on high-tension circuits. It may be operated by hand or by automatic means similar to those now used in connection with oil circuit breakers; that is, by means of an overload, reverse current, reverse energy or other form of relay, or in fact by any usual or suitable automatic mechanism. It is designed to open the circuit by means of a fuse circuit breaker which blows directly upon the occurrence of a dead short circuit. Thus the circuit is broken in much less time than with previous devices where it has been necessary to overcome the inertia of mechanical devices or to open the circuit mechanically through the operation of relays, trip coils, springs and other devices which must be set in motion.

Figures 1, 1A, 1B:
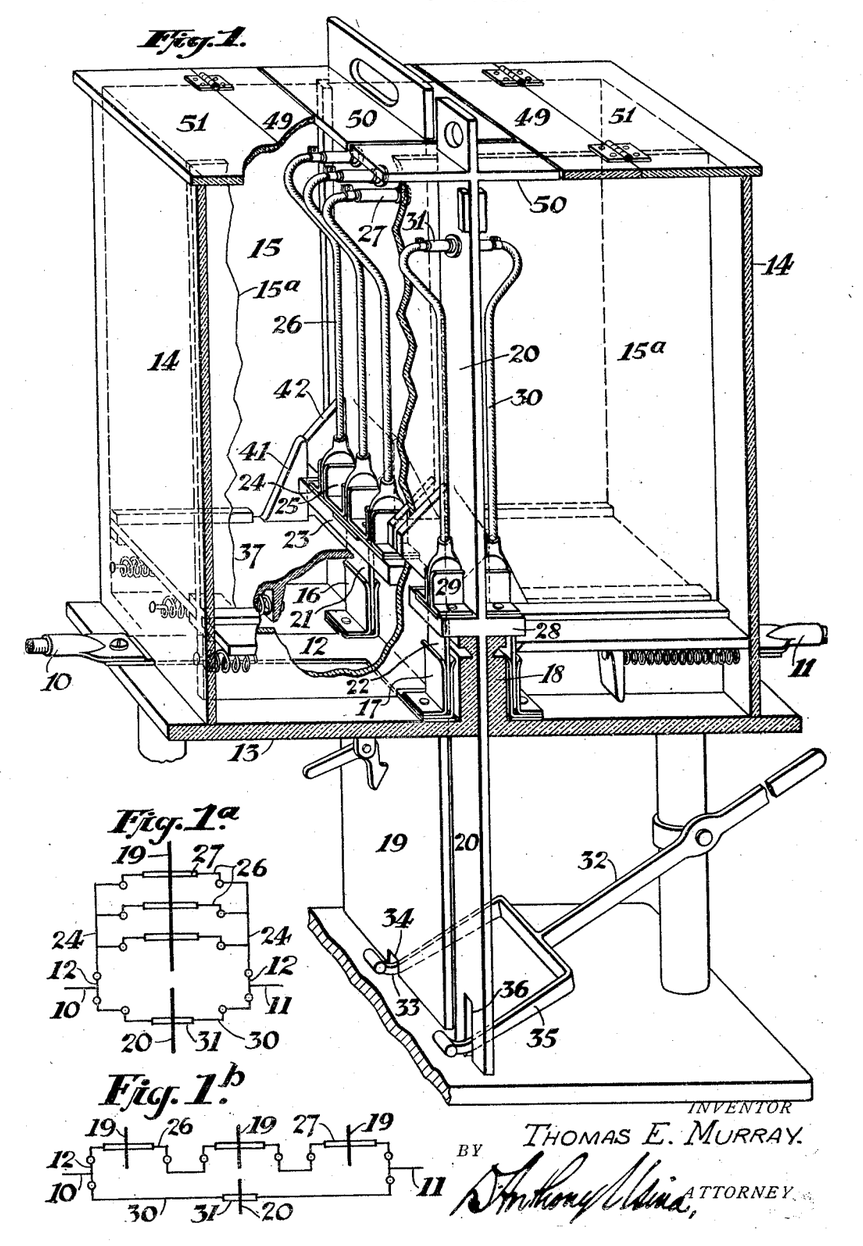
Figure 2:
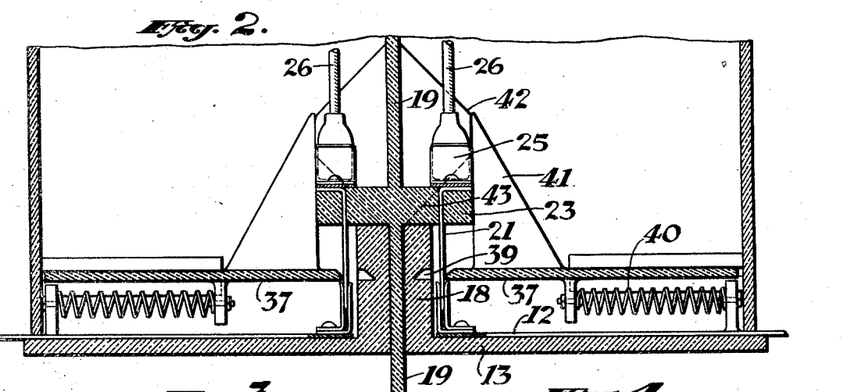
Figs. 2 and 3 are sectional views in closed and open positions respectively, of the switches.
Figure 3:
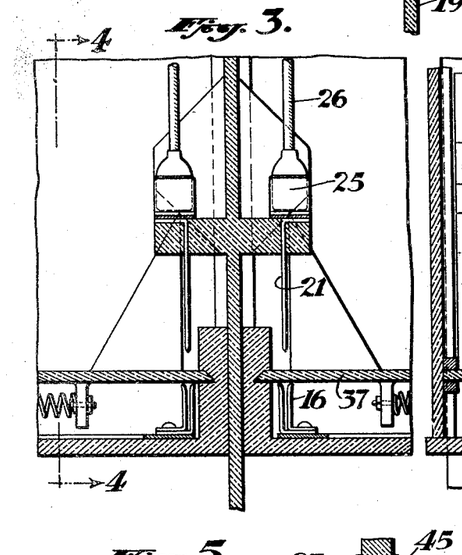

Referring first to Figs. 1 and 1ª, the main conductors 10 and 11 lead to opposite connectors 12 mounted on an insulating base 13 forming the bottom of a casing having side walls 14, rear and front walls 15, a longitudinal partition or barrier 15ª and a top or cover hereinafter referred to. There are thus two separate compartments carrying respectively the main and the auxiliary switches hereinafter described. Each connector carries two bifurcated switch blades 16 and 17. Between the two connectors is a fixed vertical transverse barrier 18 with a slot extending through it for the passage of vertically sliding carriers 19 and 20 which operate the movable switch blades 21 and 22.

At each side of the carrier 19 there is a shelf 23 on which is a conducting plate 24 in contact with the upper end of the switch blade 21 and carrying three contactors 25 which are detachably engaged by blades on the lower ends of conductors 26 which lead to fuses 27, which pass through the barrier formed by the upper part of the carrier 19 of insulating material.

The carrier 20 is similar to but moves independently of the carrier 19. It has at each side a shelf 28 with a contactor 29 connected to the switch blade 22 and adapted for engagement by a blade on the lower end of a conductor 30, the conductors 30 at opposite sides of the barrier being connected through a fuse 31 passing through the upper part of the insulating carrier 20.

The carrier 19 supports and operates, therefore, a double break switch 21 at each side, and between these switches there are three branches with a fuse in each.

The branches 26 may be in parallel as shown in Fig. 1ª; or they may be in series. The invention is useful with one or any number of such fuses. Since they are intended to take care of currents greatly exceeding normal, such as dead short circuits, and must therefore be of large capacity, it will generally be better to use several fuses.

The carrier 20 supports a double break switch 22 in parallel with the switch 21; and in the connection 30 between the switch blades 22 there is a single fuse (though here again a plurality of fuses can be used). This fuse 31 is of considerably smaller capacity in amperes than the fuses 27. Instead of having a number of fuses 27 in parallel, each of such fuses may be made of larger capacity and the number of fuses correspondingly reduced.

In the mechanical operation of the breaker the carrier 19 is actuated before the carrier 20. Various ways of securing this timing may be utilized, Fig. 1 showing a manual operation. The lever 32 has a forked end with one prong 33 engaging a short slot 34 in the carrier 19 and with another prong 35 engaging a longer slot 36 in the carrier 20. When the lever arm 32 is raised the carrier 19 will be lifted, and with it the switch blades 21 so as to break the circuit through them, before lifting the carrier 20 and its switch blades 22.

Figure 4:
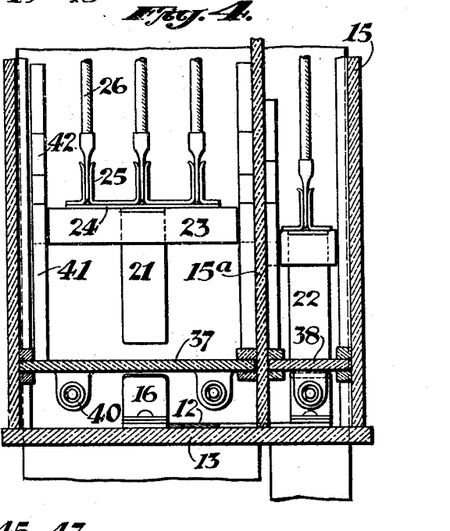
Fig. 4 is a sectional view on the line 4—4 of Fig. 3.

I have provided also movable insulating barriers 37 and 38, Fig. 4, one pair on each side of the central barrier 18. They are movable across the air space between the switch blades 21 and 16 (or 22 and 17) as the latter are separated. Their ends enter notches 39 in the central barrier 18 so that they form insulating barriers to cut off any arc between the open switch blades. Springs 40 force them forward.

When the switches are closed the barriers are held back by the upward ears 41 which bear against projections 42 on the upper part of the carrier 19. The projections 42 have tapered lower edges 43 which as the carrier rises permit the barriers 37 to spring inward, and when the carrier is drawn down force the movable barriers 37 back.

Figure 5:
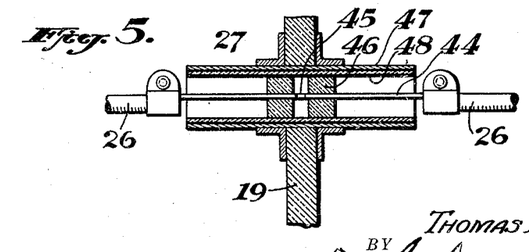
Fig. 5 is a vertical section through one of the fuses.

A suitable type of fuse 27 is illustrated in Fig. 5. The conductors 26 are clamped on the opposite ends of a fuse strip 44 having a blowing point 45 of reduced cross-section in the small space between two plugs or pistons 46 which are tightly fitted onto the fuse strip and are carried loosely in a cylinder 47 mounted in the carrier, the cylinder being lined with insulating refractory material 48.

When the fuse blows the gas generated expels the plungers 46 forcibly and quickly out of the shell and separates the burnt ends of the fuse strip so far as to prevent the maintenance of an arc between them. There is also a repulsive effect between the two conductors on opposite sides of the insulating carrier 19. The side walls 14 (Fig. 1) of the casing limit the distance to which the pistons can be blown. The conductors are detachably connected at their lower ends to the connectors 25 to facilitate replacement.

The casing is covered on the top by fixed plates 49, the space between which is spanned by flanges 50 on the carriers when the latter are down. This space is sufficient to permit the upward passage of the carrier and the fuses and connected conductor ends when the carrier is lifted. On the outer edges of the plates 49 there are hinged plates 51 which complete the closure when they are down. When a fuse blows, the gases at opposite sides of the carrier will lift the hinged plates 51 and be blown in opposite directions to the right and left so as to avoid the forming of a conductive connection, such gas being largely metallic vapor which is highly conductive.

The separate carriers project above the casing so that they can be seized or clamped and lifted out separately for repairs or replacements.

Figure 6:
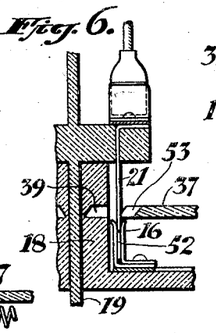
Figs. 6 and 7 being vertical elevations with the parts in different positions and Fig. 8 being a section on the line 8—8 of Fig. 7.
Figure 7:
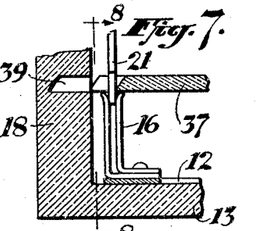
Figure 8:
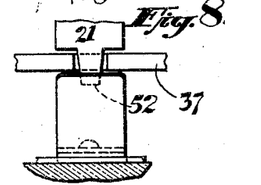

Figs. 6, 7 and 8 illustrate an advantageous design of the switch blades and movable barriers. The movable blade 21 has its lower end 52 of reduced width. The barrier 37 has a notch 53 in its end adapted to straddle the reduced end of the blade 21. When the blade is lifted from the position of Fig. 6 to that of Fig. 7, and while there is still a conducting path between the blades, the barrier 37 can advance to the point of engagement with the vertical barrier 18. Then as the upward movement of the switch blade is completed the barrier 37 will be thrown quickly across the remaining distance, closing the narrow path through which the current might otherwise jump.

Figure 9:
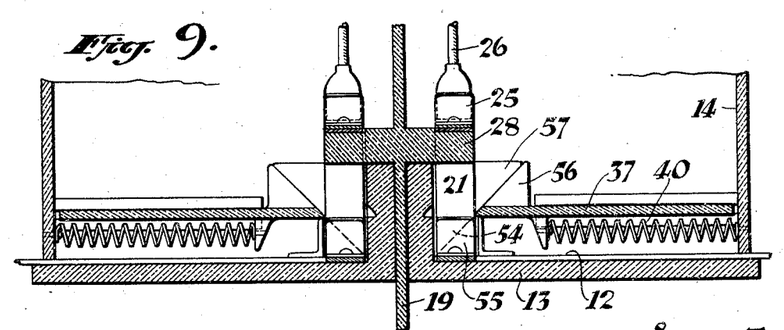
Figs. 9 and 10 are vertical sections in the closed and open positions respectively, illustrating another modification.
Figure 10:
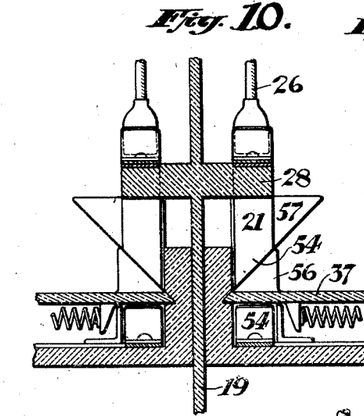

Figs. 9 and 10 illustrate another design working on a similar principle. The upper blades 21 have reduced triangular end portions 54 entering the lower blades 55; the plane of these blades extending in the direction of movement of slides 37. The latter have lugs 56 with inclined forward faces engaging the inclined faces of projections 57 mounted on the vertically moving carrier.

As the carrier is raised, the springs 40 press the slides 37 forward. The area of contact between the switch blades is diminished gradually. But there is some contact until the slides 37 are advanced nearly to their closing position. The final lifting movement of the switch blades permits the slides 37 to move entirely across the gaps to the position of Fig. 10.

Figure 11:
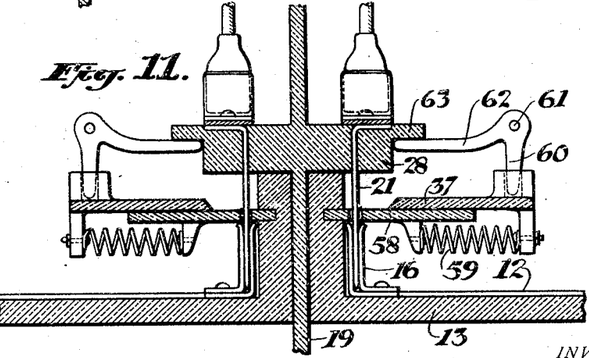
Fig. 11 is a view similar to Fig. 9 of another modification.

Fig. 11 illustrates a different style of device for actuating the sliding barriers 37. They rest on fixed plates 58 through which the upper blades 21 pass. Tension springs 59 urge the barriers forward. They are held back by engagement with the arms 60 of levers mounted on fixed pivots 61 and having arms 62 bearing under projections 63 on the projecting shelf 28 which forms part of the barrier 19. As the latter is raised, the slides 37 are released to bear against the blades 21 and to spring across the gaps as soon as the blades are sufficiently elevated. To lower the carrier and blades, the slides 37 are first withdrawn by pressing down the lever arms 62.

Figure 12:
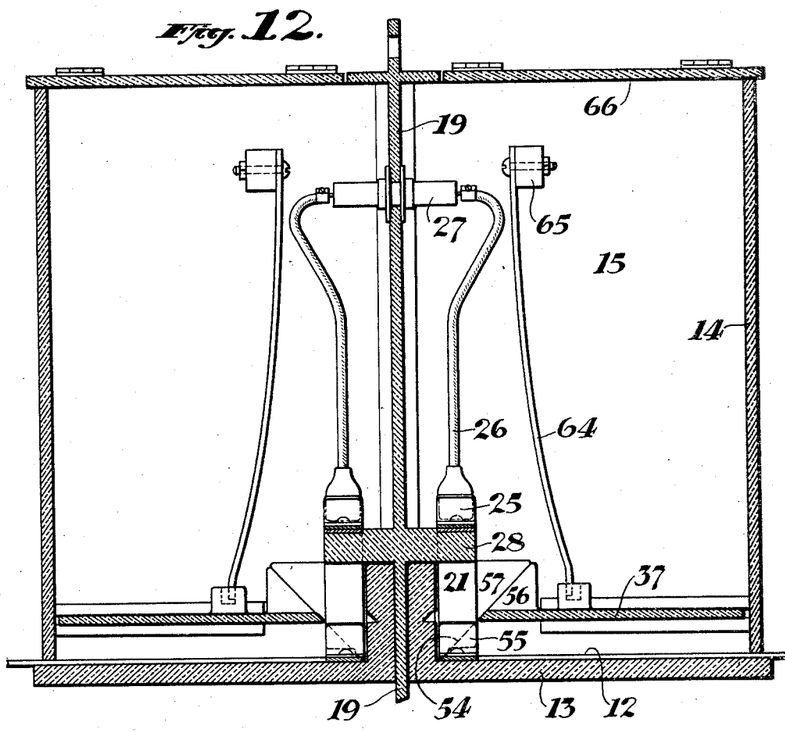
Figs. 12 and 13 are views similar to Figs. 9 and 10 illustrating another modification.

Fig. 12 shows a construction similar to that of Fig. 9 except that the slides 37 are urged forward by long leaf springs 64 fastened at their upper ends to cross bars or studs 65 supported from the walls of the box. This figure is used also to illustrate a casing with cover sections 66 hinged at the back instead of on their inner edges as in Fig. 1. The lifting of the covers 66 permits the carriers with their attached fuses and connections to be lifted out of the casing.

Figure 13:
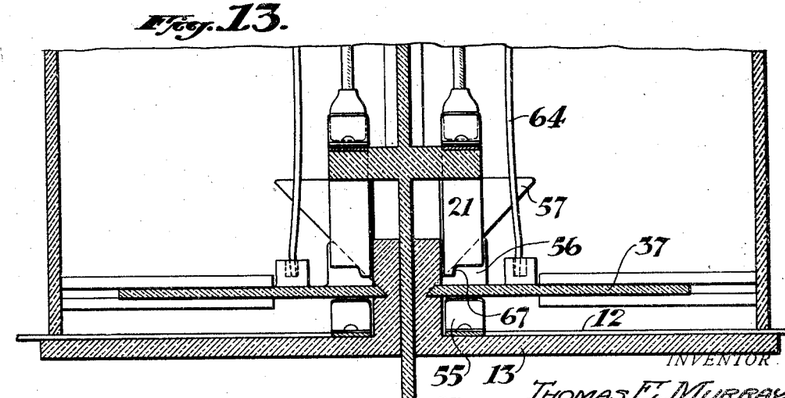

Fig. 13 shows the blades 21 lifted and the slides 37 sprung inward by means of the springs 64. At the same time this figure shows a possible modification of the shape of the lower end of the switch blades 21; these being stepped as shown at 67.

Figure 14:
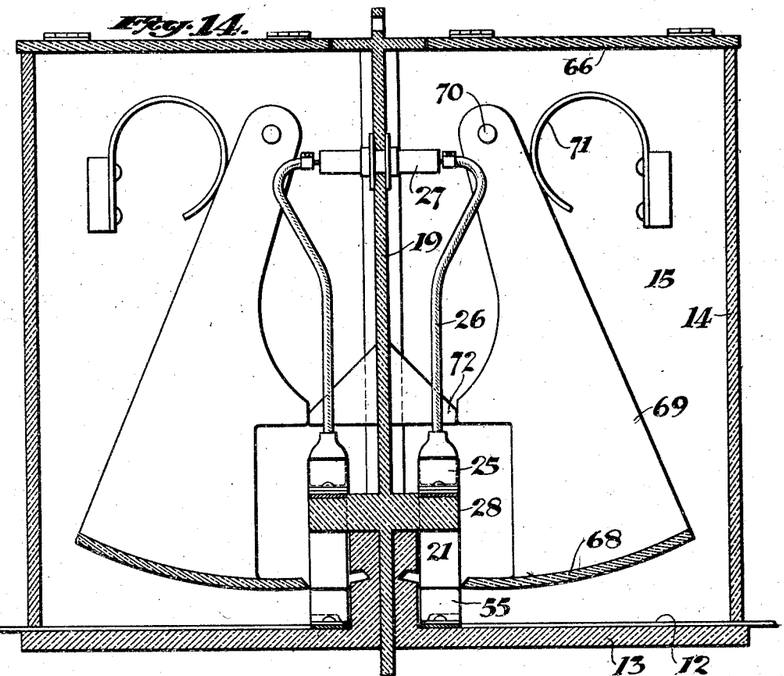
Figs. 14 and 15 are similar views of still another modification.
Figure 15:
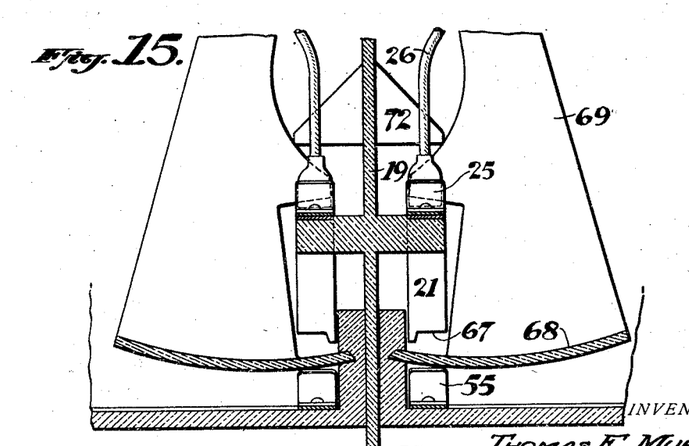

Figs. 14 and 15 illustrate the use of curved slides or barriers 68 carried on the lower ends of arms 69 mounted on fixed pivots 70 in the sides of the casing which are pressed forward by leaf springs 71 similarly supported. The carrier 19 has projections or cams 72 which engage the forward edges of the arms 69 and hold the barrier 68 retracted when the slide is down (Fig. 14), and release it and allow the slide to spring inward when the switch blade 21 is lifted clear (Fig. 15).

Figure 16:
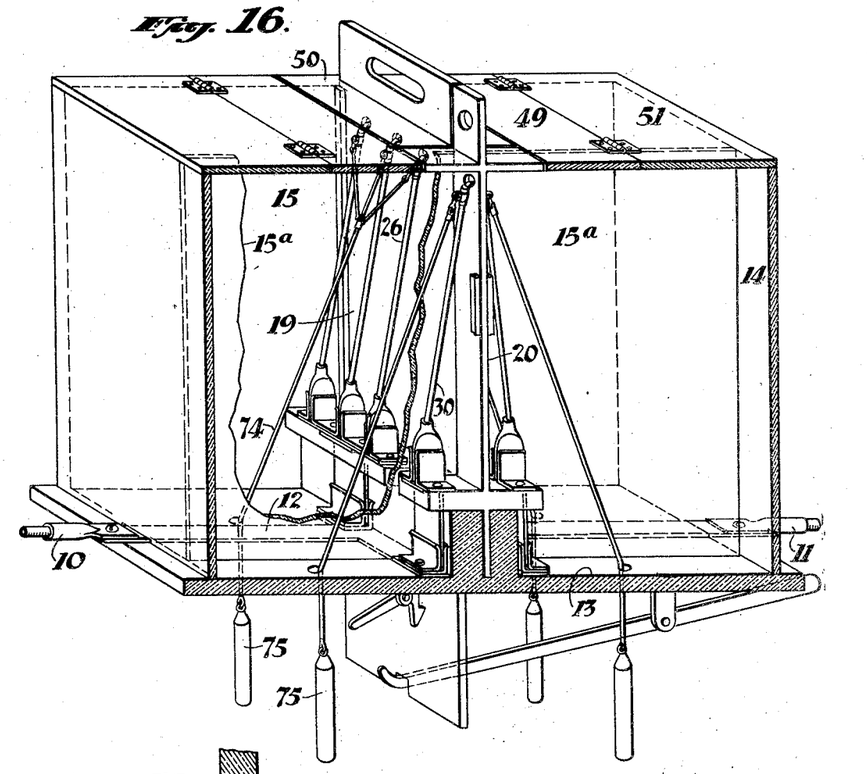
Fig. 16 is a perspective view in section illustrating the invention utilizing a different type of fuse.
Figure 17:
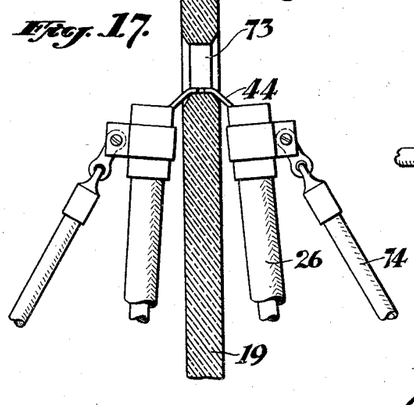
Figs. 17 and 18 are respectively a vertical and a horizontal section of the fuse and related parts.
Figure 18:
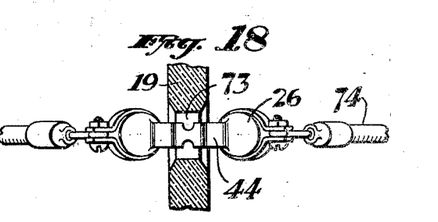

It is important that the ends of the conductors adjacent to the fuse should be promptly and widely separated when the fuse blows, as described in connection with Fig. 5. Figs. 16 and 18 show an alternative method of securing this result. The fusible strips 44 pass in the open through holes 73 in the insulating carrier 19. To the upper ends of the conductors 26, are connected wires or metal cords 74 which lead through holes in the base 13 to weights 75. Or springs may be used as equivalents to the weights. Now when a fuse blows the adjacent ends of the conductors are quickly drawn down to the base of the casing at opposite sides of the insulating carrier, the separation being greater than any possible length of arc which could be maintained between the burnt ends. These figures illustrate the apparatus without the sliding barriers; which, however, can be used with this and with various other arrangements of the fuses. The fuses which connect the main conductors 26 will all blow at once and a single cord 74 and weight at each side is arranged to pull down the ends of all the three conductors. A separate pair of cords and weights is used for the auxiliary set of conductors 30.

Figure 19:
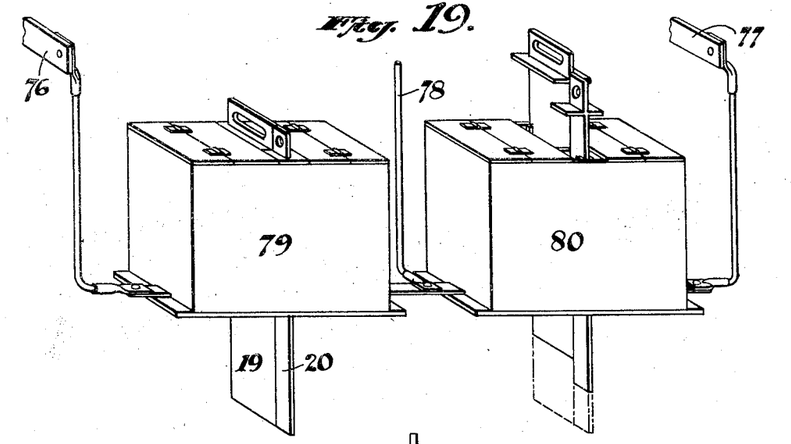
Fig. 19 is a perspective view of the apparatus used as a selector switch mechanism.

Fig. 19 illustrates the application of the invention in connecting a main bus 76 and an auxiliary bus 77 to a feeder 78. The switching mechanisms of the type illustrated in Fig. 1, are shown at 79 and 80 respectively interposed in the connections from the buses to the feeder. The mechanism 79 is in the closed position and 80 in the open position so that the feeder is connected to the bus 76 and disconnected from the bus 77.

Figure 20:
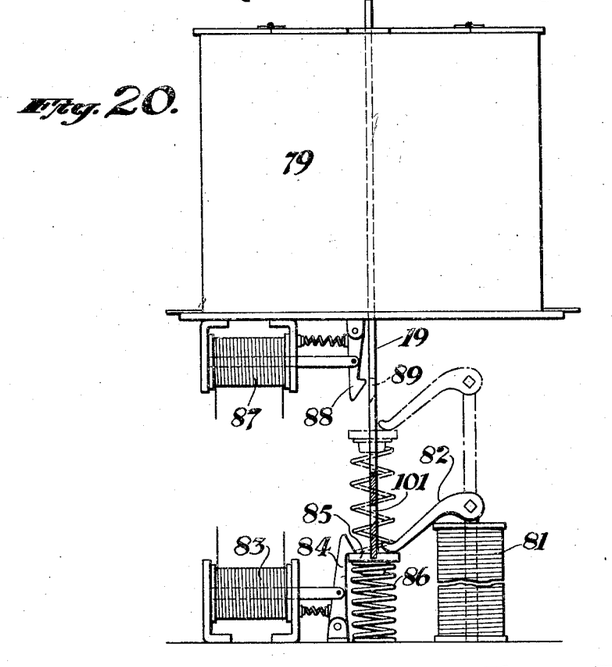
Fig. 20 is an elevation, partly in section of a suitable operating mechanism.

Fig. 20 illustrates a solenoid mechanism for actuating the carrier 19 of the main switch. In the full line position a solenoid 81 has been energized to pull down the carrier by means of an arm 82 on the solenoid core, and a magnet 83 has released a spring latch 84 to engage a plate 85 on the bottom of the carrier and to hold the latter down against the resistance of a spring 86. When the switch is to be opened the solenoid 83 is energized. The solenoid 81 being de-energized, the spring pushes up the carrier 19 to the dotted position and the solenoid 87 being also de-energized allows the latch 88 to enter the opening 89 and hold up the carrier 19. This mechanism serves to give the desired quick and wide separation of the switch blades.

Referring back to Fig. 1ª, I have connected to the connectors 12 a main switch comprising the conductors 24 with the parallel conductors or bridges 26 between them, each carrying a fuse 27; and an auxiliary switch comprising the conductor or bridge 30 with the interposed fuse 31. The main switch is operated by the carrier 19, and auxiliary switch by the carrier 20.

The conductors 12 are designed of such capacity in the different parts that in normal operation the current will be so distributed through the main and auxiliary switches that there will be no liability to blowing of any of the fuses.

When the main switch is operated by raising the carrier 19 manually or automatically, the separable terminals of the several conductors 26 will be equally moved and the necessary gap will be provided to break the circuit therethrough. The movable barriers will also close the spaces to prevent current arcing across the terminals. Such barriers, however, are not essential in all cases. Fig. 1ᵇ shows a variant in which the switches 26 are arranged in series between the lines 10 and 11 so that the total air gap when the switch is opened by raising the carriers 19 will be three times the extent of movement. Otherwise this arrangement is similar to Fig. 1ª.

The breaking of the circuit through the main switch will throw the entire load through the auxiliary switch which remains closed and the auxiliary fuse 31 will blow and thus completely break the circuit. When this happens the movable barriers of the main switch serve an important purpose in preventing current arcing across the terminals of the main switch. The fixed longitudinal barrier 15ᵃ will prevent the passage of any flaming gas from one to the other of the compartments carrying the main and auxiliary switches respectively.

The scheme of breaking the circuit in this way by a comparatively small fuse which blows upon the opening of the switch is claimed in a pending application of Thomas E. Murray, Jr. No. 257,861, filed February 29, 1928.

In case of a dead short circuit or similar sudden overload, greater than the automatic operating mechanism can take care of (or where no such automatic mechanism is provided) the fuses in the main switch will blow; the comparative resistances in the branches of the circuit being regulated so that the percentage of overload will be greatest through the main switch. When this happens the entire load will be thrown on the auxiliary circuit and its fuse will blow immediately and complete the break in the circuit.

When either the auxiliary fuse alone or both sets of fuses have been blown, new fuses must be inserted before restoring the circuit. For this purpose the fuse carriers are lifted to bring the fuses above the cover of the box so that they are accessible for removing the old and inserting the new fuses. The mounting of the fuses is not illustrated in detail; any usual or suitable mounting being available to permit such replacement.

The invention is illustrated for a single line or conductor. For a multiple phase circuit, the apparatus described will be repeated for each phase. The capacity of the several fuses in the main switch (or of the single fuse, if only one be used) is preferably such that it will blow only upon the passage of a current which is substantially higher than its rated capacity; the rated capacity being the normal current on the circuit. The fuse should operate only with the current at least ten per cent above its rated capacity and preferably many times its normal (say fifteen times). This is to insure that it will not operate except on an extreme short circuit. For anything less, the automatic mechanism will be depended upon to lift the carrier and open the switch.

On a two hundred ampere load, for example, a three thousand ampere fuse may be used. In this way I avoid any substantial heating of the fuse and any break from small troubles.

The ordinary fuses in electric circuits are designed for a very small overload, about five per cent in most cases. So that a two hundred ampere fuse is designed to blow at about two hundred and ten amperes. The fuse in the auxiliary switch on the other hand is of very small capacity compared with the normal current so that it will blow immediately upon the opening of the main switch.

It may, for example, be a fuse of five or ten amperes capacity for a circuit carrying a normal load of two hundred amperes. And although the auxiliary fuse has its conductors 30 disconnectible at their lower ends from the circuit, yet this is not a switch in the ordinary sense. The detachable connectors are not used to open the circuit. It is only after the circuit is broken and the fuse is blown that the terminals are disconnected while the fuse is being replaced.

The movable barriers described are covered separately in another application and are claimed herein only in connection with the fuse arrangement.

Various modifications in detail may be made by those skilled in the art without departing from the invention as defined in the following claims.

I claim:

1. Apparatus of the type described which comprises, a pair of electric circuit terminals, a movable barrier separating said terminals, a switch member extending through said barrier and connecting said terminals and a fuse connected in parallel with said switch and of a capacity to blow upon the opening of said switch.

2. The apparatus of claim 1, in which the fuse is mounted on a sliding barrier between said terminals.

3. The apparatus of claim 1 in which fuses are included in the switch of a capacity much greater than that of the fuse connected in parallel.

4. The apparatus of claim 1 in which an insulating plate is automatically moved between said terminals and said switch upon the opening of said switch.

5. Apparatus of the type described which comprises a pair of switch terminals for a high tension electric circuit, an enclosure for said terminals having an insulating barrier between said terminals, a slidable switch bridging said terminals across said barrier, an arc intercepting plate and means for automatically moving said plate into arc intercepting position against said barrier upon the sliding of said switch to open position.

6. The apparatus of claim 5 and a fuse in said switch.

7. The apparatus of claim 5 and a fuse connected in parallel between said terminals and of less capacity than said switch.

8. The apparatus of claim 5 and, a fuse connected in parallel between said terminals and of less capacity than said switch and a carrier for said fuse slidable in said barrier to sever the connection of said fuse to said terminals.

9. The apparatus of claim 5, a fuse connected in parallel between said terminals and of less capacity than said switch, a carrier for said fuse slidable in said barrier to sever the connection of said fuse to said terminals and an actuating means for said switch and fuse carrier to successively open said switch and shift said fuse carrier.

10. Apparatus of the type described which comprises a pair of circuit terminals, a switch bridging said terminals, a fuse bridging said terminals, means for separating said switch from said terminals while said fuse is connected to said terminals and then separating said fuse from said terminals.

11. Apparatus of the type described which comprises an enclosure having a barrier of insulating material, a pair of high tension electric terminals the terminals of said pair being on opposite sides of said barrier, a pair of carriers slidably mounted in said barrier, and projecting from opposite walls of said enclosure, a switch mounted on one of said carriers to engage and bridge said terminals, a fuse comprised in said switch, a second switch mounted on said second carrier and bridging said terminals in parallel with said first switch, a fuse of less capacity than that of said first switch comprised in said second switch and an actuating means to successively engage said first and said second switch carriers and move them to open position.

12. The apparatus of claim 11 and an arc quenching means slidable to engagement with said barrier between said terminals and the engaging ends of said switches.

13. The apparatus of claim 11, an arc quenching means slidable to engagement with said barrier between said terminals and the engaging ends of said switches, and in which the switches and quenching means are formed to limit the path and dimensions of the arc as the quenching means moves to quenching position.

14. Apparatus of the type described which comprises an enclosure having an insulating barrier and a pair of electric terminals, the terminals of said pair being on opposite sides of said barrier, a carrier of insulating material slidable in said barrier and extending through opposite walls of said enclosure to form separate compartments on opposite sides of said barrier, a switch carried by said carrier and bridging said terminal and breaking contact therewith upon the sliding of said carrier, and a fuse connecting said contacts in parallel with said switch and immediately after the opening of said switch, said fuse being of a less capacity than said switch.

15. The apparatus of claim 14 in which the fuse on blowing separates the fuse terminals beyond possible arcing distance.

16. An apparatus of the type described which comprises a pair of electric circuit terminals and a barrier separating said terminals, a movable switch member extending through said barrier and connecting said terminals, and a fuse connected in parallel with said switch and of a capacity to blow upon the opening of said switch.

In witness whereof, I have hereunto signed my name.

THOMAS E. MURRAY.